(12) United States Patent
Dewitte et al.

(10) Patent No.: US 7,068,391 B2
(45) Date of Patent: Jun. 27, 2006

(54) PROOFING METHOD, APPARATUS, AND COMPUTER SOFTWARE PRODUCT MATCHING COLOR AND HALFTONE SCREEN PROPERTIES

(75) Inventors: Hans Dewitte, Brugge (BE); Lieven C. G. Plettinck, Wingene (BE)

(73) Assignee: Barco Graphics, NV, Zwijnaarde (BE)

( * ) Notice: Subject to any disclaimer, the term of this patent is extended or adjusted under 35 U.S.C. 154(b) by 1260 days.

(21) Appl. No.: 09/792,623

(22) Filed: Feb. 23, 2001

(65) Prior Publication Data

US 2002/0008880 A1    Jan. 24, 2002

Related U.S. Application Data

(60) Provisional application No. 60/188,929, filed on Mar. 8, 2000.

(51) Int. Cl.
G06K 1/00    (2006.01)
G06K 15/00   (2006.01)
(52) U.S. Cl. .................................... 358/1.9; 358/3.07
(58) Field of Classification Search ........ 358/1.1–1.18, 358/3.01–3.02
See application file for complete search history.

(56) References Cited

U.S. PATENT DOCUMENTS

| | | | |
|---|---|---|---|
| 4,500,919 A | 2/1985 | Schreiber | 358/78 |
| 5,235,435 A | 8/1993 | Schiller | 358/456 |
| 5,526,140 A | 6/1996 | Rozzi | 358/535 |
| 5,543,941 A | 8/1996 | Parker et al. | 358/534 |
| 5,689,349 A | 11/1997 | Plettinck et al. | 358/500 |
| 5,781,709 A | 7/1998 | Usami et al. | 395/109 |
| 5,854,883 A | 12/1998 | Madeley | 395/109 |
| 6,060,208 A | 5/2000 | Wang | 430/201 |
| 6,097,503 A * | 8/2000 | Felleman | 358/1.9 |
| 6,469,806 B1 * | 10/2002 | Richenderfer et al. | 358/3.21 |

FOREIGN PATENT DOCUMENTS

| | | |
|---|---|---|
| EP | 0402079 | 12/1990 |
| EP | 0501942 | 9/1992 |
| EP | 053776 | 2/1994 |
| EP | 0627846 A1 | 12/1994 |
| EP | 0963104 A1 | 12/1999 |
| EP | 1139654 A2 | 10/2001 |

* cited by examiner

*Primary Examiner*—Douglas Q. Tran
(74) *Attorney, Agent, or Firm*—Dov Rosenfeld Inventek (57) ABSTRACT

A method, apparatus, and computer software product to reproduce an input image on a proofing device including accurately reproducing color substantially matching the screening properties of an imaging process that includes screening. The proofer may use a different number of colorants and/or different colorants than the printing colorants of the imaging process. The proofer also may be capable of continuous tone output or may be a screened output device. The proofer also may be a computer screen.

53 Claims, 3 Drawing Sheets

PROOFING METHOD, APPARATUS, AND COMPUTER SOFTWARE PRODUCT MATCHING COLOR AND HALFTONE SCREEN PROPERTIES

RELATED U.S. APPLICATION

This application claims the benefit of Provisional Patent Application Ser. No. 60/188,929, filed Mar. 8, 2000, entitled "PROOFING METHOD MATCHING COLOR AND HALFTONE SCREEN PROPERTIES". Provisional Patent Application Ser. No. 60/188,929 is incorporated herein by reference.

BACKGROUND OF THE INVENTION

Several of the popular printing techniques such as offset, flexography, and gravure are rapidly being modified to accommodate computer-to-plate (also called "direct imaging") technology according to which the final image carrier is made without the use of one or more intermediate films. Computer-to-plate technology offers savings in manpower, material (film) and environmental costs. One drawback of direct imaging technology is proofing.

Traditionally, approval/acceptance of jobs prior to printing is mostly done by proofing using special proofing sheets such as Cromalin® or WaterProof® proofing sheets (E. I. du Pont de Nemours and Company). These proofing procedures typically use film as an image carrier. These prior-art procedures produce high quality proofs that are accepted as trustworthy for most printing applications. These proofing methods have evolved over the years, and are reasonably convenient to use for proofing CMYK colorants.

For proofing spot colors and special inks (in general, "non-CMYK inks"), for example PANTONE® colors, using such special proofing sheets, it is usually necessary to mix powders and brush them by hand on the substrate. This is a very tedious process that has poor repeatability. Avoiding has been attempted in the past by converting all colors, including the spot colors to CMYK, but such prior art techniques have resulted in proofs wherein the screening information of the spot colors is lost. Contrary to the case of what would happen in the output imaging process that includes real printing, proofs on special proofing sheets of almost all spot color solids will have CMYK rosettes. This may be a serious drawback, for example in packaging printing applications. It would be advantageous to improve film-based proofing of non CMYK inks.

When moving to computer-to-plate technology, the intermediate film is no longer needed. It is desired to avoid making films just for proofing, since that would negate many of the advantages of computer-to-plate technology. Thus there is a need to replace traditional film-based proofing.

There is a need for a method to proof artwork for printing on a proofing device (also called a "proofer") that includes color matching and halftone screen emulation close to the desired halftone screens that would be used on the final print. Note that by, "a method for proofing," is meant both preparing the data for output on a proofing device, and the combination of the steps of preparing the data for output on a proofing device and generating the proof on the proofing device.

It is desirable that such a method provide for the proofer color space to be different from the printing device color space. Furthermore, it is desirable that such a method provide for the base colorants (the ink set for printing) for the proofer to possibly differ from those for the final print. Existing devices that support halftone screen matching may not work under these situations.

One possible application of such a method is halftone screen matching for spot colors on a cyan-magenta-yellow-black (CMYK) proofer. A further application of such a method is sample making. Sample making is the process of making a limited number of copies ("samples") of the final artwork to be used for test marketing, approval by a wide range of people, launching a product, etc. Sample making is more than printing. It includes the printing and the finishing steps to produce the printed product which may be a package (e.g., a printed box), a label (e.g., a label for a bottle or a wrapper for bottles), a book, and so forth.

DESCRIPTION OF THE PRIOR ART

The most popular proofers for film-less operations probably are high quality grey-scale ink-jet devices such as the IRIS ink-jet proofer (Iris Graphics Billerica, Mass.) or the Digital WaterProof® ink-jet color proofing system by E. I. du Pont de Nemours and Company. These devices produce multiple grey levels per separation and per pixel and offer a high level of color quality and repeatability. After a sometimes difficult process of calibration, typically based on CIE-Lab color management systems, these devices produce color that can be matched to the final printed color within an acceptable error range.

Note that these high quality ink-jet devices produce the grey levels per separation by using some inherent halftone (screening) methodology, but a user has no access to the screening, so that these devices are essentially grey-scale ink-jet devices.

Typically, these grey-scale ink-jet proofers produce images at lower resolution than the final print. Because they produce multiple grey levels per separation and per pixel, digital halftoning such as used in offset printing is no longer needed. A typical resolution is 300 pixels per inch, sometimes expressed as dots per inch (dpi). The multiple grey levels per separation and per pixel enable these proofers to produce an acceptable level of detail rendition and contrast; otherwise, such a low resolution would be totally unacceptable, for example for offset or flexo platemaking.

Other low-resolution devices also are known that include screening such as stochastic screening or dithering, and such devices may be used for filmless proofing.

There are two important differences between the output from these prior art proofers and the final print. These are:

substrate differences, and screening.

Traditional film-based proofing processes also produce proofs on a substrate that is different from that of the final print. Emulation software exists that attempts to make substrate differences less visually obvious. Furthermore, different kinds of substrates are available to further diminish the differences caused by the fundamentally different imaging processes.

Screening difference is also a problem with traditional prior-art film-based proofing, so that the screening and all related effects such as rosettes are accurately produced. A high quality grey-scale ink-jet device does not have screening. Other low-resolution devices do use screening, but such screening is unrelated to, and thus does not accurately represent the screening on the final print.

Print buyers typically want to know what screening effects will be present in the final image. Thus, there have been serious attempts to get proofs with the correct screens.

This effort led to the development of "screened proofers" such as the dry thermal laser imaging system called Kodak Approval® (Eastman Kodak Company). Screened proofers typically work at a high resolution similar to the final offset process resolution and use colorants as near as possible to the final colors (inks) to be used in final printing. Color management is not used since current color management tools drastically change the screened dot percentages of the different separations. With the current state of the art, these screened proofers still have important drawbacks:

Screened proofers are very expensive. Typically, they are two to three times more expensive than the continuous tone ink-jet digital proofers.

Making a proof is a time consuming operation. It may take more than 30 minutes to make a single proof, and the process may require operator assistance.

The proofing consumables are expensive for such screened proofers.

Spot colors colorants are not widely available for such proofing processes. In many cases, it is necessary to convert such spot colors to CMYK, this way loosing the screen consistency.

Color management is mostly not used, so the color match is very dependent on the physical or chemical match between the proofing colorants and the colorants used for final printing. In practice, this means that these screened proofers may be able to handle normal offset CMYK workflows well, but have serious trouble with more cumbersome printing processes such as flexography for packaging, which uses process ink CMYK colorants that deviate significantly from standard CMYK inks, and which frequently uses spot colors.

In cases in which color management is used, the matching of the screening properties is lost.

Thus there is a need for economical direct (non-film-based) proofing that includes screening effects and color matching.

European Patent publication EP 0 402 079 to Takanashi, et al. (published Sep. 14, 1994) describes a proofing method that uses one sheet per printing separation. The number of proofer colors is fundamentally equal to the number of printing colors. The proofing sheets have similar colors as the press colors. The only difference that can be compensated electronically is a gradation difference. Resolutions of the proof and final print must be equal.

U.S. Pat. No. 5,854,883 to Madeley (issued Dec. 29, 2998) describes a proofing method which generates an electronic halftone screen for each color of a printing press at a lower resolution than the resolution of the imagesetter making the final printing plates. The method described allows one to make a halftone simulation on a continuous tone proofer at, for example, 300 dpi. Although this method surely is a step in the direction of screened proofing cheaper than the full resolution screened proofers, there are some fundamental restrictions:

The method is aimed at low-resolution continuous tone proofers such as a high quality ink jet printers. Such high quality proofers are still expensive, albeit less expensive than high resolution screened proofers.

When the number of printing colorants is different from the number of proofing colorants, or when the nature of those colorants is different, the method of U.S. Pat. No. 5,854,883 suggests color transformation for handling the transition to the proofing colorants. Standard software such as Adobe Photoshop® (Adobe Systems, Inc., San Jose, Calif.) is suggested for the color transformation. This is less straightforward than it sounds. The color transformation must be done after resampling to the proofing resolution because standard color management methods used for color transformation transforms continuous tone pixel values, not binary bitmap values where each pixel is 1 or 0. So the "standard" color transformation software must convert continuous tone images containing a screening simulation. This can be done the regular way (since a screened image is still an image, albeit with either 0 or 100% ink converage), but color stability is in doubt since the continuous tone proofing methods are not designed for proofing screened images. In many cases, including using a high quality ink-jet proofer such as the IRIS (Iris Graphics Billerica, Mass.), the method can result in a moiré clash between the original screen and the screening patterns used by the ink-jet proofer itself to produce the continuous tone.

Experience has shown that the resolution of the continuous tone proofers (typically 300 dpi) is too low to get a good (representative) result for halftone screens of over 120 lines per inch (lpi).

U.S. Pat. No. 5,781,709 to Usami, et al. (issued Jul. 14, 1998) describes a method for generating a screened proof at lower resolutions. The method assumes one has a lower resolution non-screened image, for example from a scanner scanning an original image document. The screening simulation (called "image structure simulation") is applied to this image and a look-up table is applied to correct for color shifts produced by the image structure simulation.

These look-up tables are position dependent, whereas normal color conversion look-up tables are not. The Usami, et al. method further only describes screening of the high-resolution image carried using threshold arrays, a method also know as "supercell screening." A threshold array is placed over the image and the screening is carried by comparing the values in the threshold array with the values in the original image beneath the array. The threshold array, also called the supercell, is typically far smaller than the image to be screened, so one repeats the threshold array in two dimensions in order to fill the complete original image. This is sometimes called tiling the supercell.

The Usami, et al. method uses the high-resolution threshold array to determine a "color shift correcting look-up table" for simulating the screening effects at low resolution. Although not explicitly made clear in the enabling description, the method requires $n_{pix}$ look-up tables, where $n_{pix}$ is the number of pixels in the threshold array. In some applications, $n_{pix}$ can be as high as 100,000 and each look-up table can require up to 1 Mbyte of memory, which is not always practical. Furthermore, the Usami, et al. method may require that the dimensions of all the threshold array of the different colorants (e.g., printing inks) be the same, otherwise even more than $n_{pix}$ look-up tables may be required.

In general, the Usami, et al. method may be restricted to those situations where the threshold arrays are known, so that there needs to be a strong relationship with the raster image processor (RIP) that rasterizes descriptions such as page description language files, and there needs to be access to the non-screened data. The Usami, et al. method may not be applicable to proofing starting from an already screened file (sometimes called a copydot file).

Thus there is still a need in the art for a proofing technique that can reproduce color and halftone screening effects.

SUMMARY

Described herein is a method, apparatus, and computer software product to proof artwork on a digital proofer, to proof the artwork for output imaging (e.g., final printing). This proofing includes color matching and halftone screen emulation close to the desired halftone screens that would be used on the output imaging.

One embodiment is a method of proofing on a proofer, for example a hardcopy proofer or a display screen for "soft" proofing or a film-based proofing device. The proofer uses a number, denoted M, of color components such as colorants. The proofer further operates at a proofing resolution, which, in one embodiment is an integer RES2. The graphic art proofed is for output imaging, for example on a set of films or a set of plates followed by printing on a printing device. The output imaging resolution is called the printing resolution and, in one embodiment is an integer RES1. The units for resolutions RES1 and RES2 may, for example, be in units of dots per inch (dpi). The number of output imaging color components, i.e., the number of printing colorants (e.g., inks) is denoted by an integer N. In one embodiment, the input graphic art is an image of N screened binary color components at a resolution RES3, which may be the same as or different than the printing resolution RES1. This input, for example, may be a file of N bitmaps. At least one of the M proofer color components is different from any of the N printing device color components. In one embodiment, M is smaller than N. The proofing method includes the steps of:

Converting the N binary component screened image at RES3 to a continuous tone (contone) image with M contone components. Note that such a contone image may be represented by M single color contone images.

Converting the M component continuous tone image at RES3 to an M component continuous tone image at the proofer resolution (RES2).

Imaging the M images at the proofer resolution on the proofer.

In one embodiment, the RES3 input is produced by raster image processing (RIPping) and screening an original image to generate the N-component screened image, for example in the form of N bitmaps at the resolution RES3. RES3 is thus called an intermediate resolution herein.

In one embodiment using irrational screen halftoning, the screens in the N-component screened image (at RES3) substantially match the screens of the output imaging process (at RES1). In one embodiment, substantially match means that the screen rulings differ by 5% or less, the screen angles differ by 1% or less, and the dot shapes of the screens are substantially the same.

In one embodiment, the N-component screened image of the RIPping and screening step are generated making use of a dot gain compensation curve.

According to one embodiment, the M proofer color components are the CMYK inks of a graphic arts proofer. According to another embodiment, the M proofer color components are the RGB channels of a computer display screen.

In one embodiment, the step of converting to a M-component contone image is implemented using a look-up table with $2^N$ entries and M output values for each entry: The look-up table includes color matching.

The method of the invention can be implemented fully digitally and need not require additional hardware or consumables. It is therefore an economical proofing solution for today's printing industry.

Compared to prior art methods, the embodiments of the present invention provide the following advantages:

The method can start from the non-screened data or from screened data (so called copydot data).

The proofer can be a continuous tone proofer or a screened proofer, and can be a high resolution proofer or a relatively low resolution proofer.

In one embodiment, the method incorporates color management at high resolution at very high speed. Note that the number of colors patches requiring measurement for the color management is extremely limited compared to conventional color management methods and certainly when compared to the prior-art method described in U.S. Pat. No. 5,781,709.

These advantages make embodiments of the invention particularly attractive for use with non-continuous tone relatively high-resolution proofers. There are two important classes of such proofers:

High resolution screened proofers such as Kodak Approval®. In this case, an embodiment of the invention may be used to simulate non CMYK colors (or different CMYK colors) with the four standard provided proofer colors C, M, Y and K, while preserving both correct color and screening information.

Inexpensive ink jet proofers, such as consumer oriented color ink-jet printers. The resolution of such inexpensive ink jet devices has changed dramatically in the last few years. For example, color ink jet printers with 1440 dpi may be purchased for under $200. One use of embodiments of this invention is obtaining high quality screened proofs from such inexpensive devices. Apart from the cost saving aspect, this would also enable making high quality proofs in areas that were difficult to tackle earlier: large formats (high quality proofs were in practice mostly limited to A2 sizes and smaller) and a far broader range of substrates including carton board or flexible materials.

Other objects and aspects of the invention will be clear from the description below.

BRIEF DESCRIPTION OF THE FIGURES

In order to show the features of the invention, without any limitation implied therein, several embodiments of the invention are described in greater detail, with reference to the enclosed drawings in which.

DETAILED DESCRIPTION

Figure 1A:
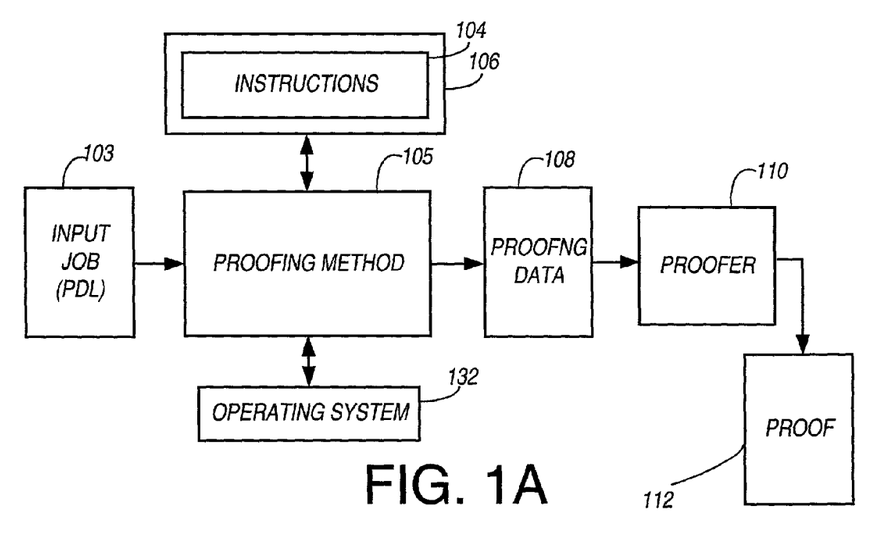
FIG. 1A shows an implementation of the invention as a method operating on an input image.

Referring to FIG. 1A, one embodiment is a proofing method 105 that operated on an input 103. Note that a "method for proofing," a "method to proof," and a "proofing method" herein each refers to preparing the data for output on a proofing device, and also to the combination of the steps of preparing the data for output on a proofing device and generating the proof on the proofing device. The input 103 may be a job 103 for proofing provided as a Page Description Language (PDL) file 103 for output printing at a printing resolution, denoted herein as RES1, which typically is expressed in dots per inch (dpi). The process of producing final output from the input 103 is called "output imaging" herein. The output imaging typically includes imaging on a film or plate for final printing on a printing press. The input 103 is assumed to be defined in a number of base colors, and this number is denoted by B herein. The final printing of the output imaging, e.g., on the printing press, uses a number of printing colorants (e.g., printing inks), and that number is denoted by N herein. Thus, in one embodiment, the output imaging is to N films or plates, sometimes called separations. Alternatively, the imaging may be directly to a printing device that uses N printing colorants. In one embodiment, the resolution is the same in two orthogonal directions.

The format of the input 103, if a PDL file, could be Adobe PostScript® (Adobe Systems, San Jose, Calif.,) of any level, or any other page description format that describes how the job will be imaged on a printing plate or any other print carrier. Alternate description formats that may be used include Barco Graphics GRO™ or GRS™ (Barco Graphics, Gent, Belgium, the assignee of the present invention).

A PDL file typically contains a sequential list of commands, which, when interpreted, generate graphical objects such as line work (including text), continuous tone (CT, contone) images, paths (a set of vector or spline segments that describe a shape or set of line segments), bounding boxes ("invisible" rectangles that define the boundaries of an object), etc. Interpretation of the PDL file typically generates a display list of objects, and these objects normally are rasterized (raster image processed, "RIPped") prior to printing or display.

As shown in FIG. 1A, the input 103 is to be proofed on a proofing device (proofer) 110 with a proofing resolution, denoted herein as RES2, e.g., in dpi. The proofing is for example prior to output imaging and the output imaging includes final printing on the printing press. The proofer uses M proofing colorants, for example M inks in the case of a hard copy device, or M additive color components in the case of a soft copy proofer such as a display screen. Thus, while this description at times uses the term "proofer colorant," this term is to be understood to include a subtractive colorant such as an ink, or an additive color component such as red, green, or blue used to render color on a display screen. Similarly, the output imaging may be any form of output to any output device at a resolution RES1 which uses N color components, and these components may be additive or subtractive.

One aspect of the proofing method is providing for the proofer color space to be different from the output imaging printing device color space. Another aspect is providing for the colorants (the ink set for printing) of the proofer to not necessarily be the same as those for the final print.

One possible application of such a proofing method is halftone screen matching for spot colors on a cyan-magenta-yellow-black (CMYK) proofer. A further application of such a proofing method is sample making. Sample making is the process of making a limited number of copies ("samples") of the final artwork to be used for test marketing, approval by a wide range of people, launching a product, etc. Sample making is more than printing. It includes the printing and the finishing steps to produce the printed product which may be a package (e.g., a printed box), a label (e.g., a label for a bottle or a wrapper for bottles), a book, and so forth.

In one embodiment of the present invention, at least one of the M proofer color components is different from each one of the N printing colorants.

Figure 1B:
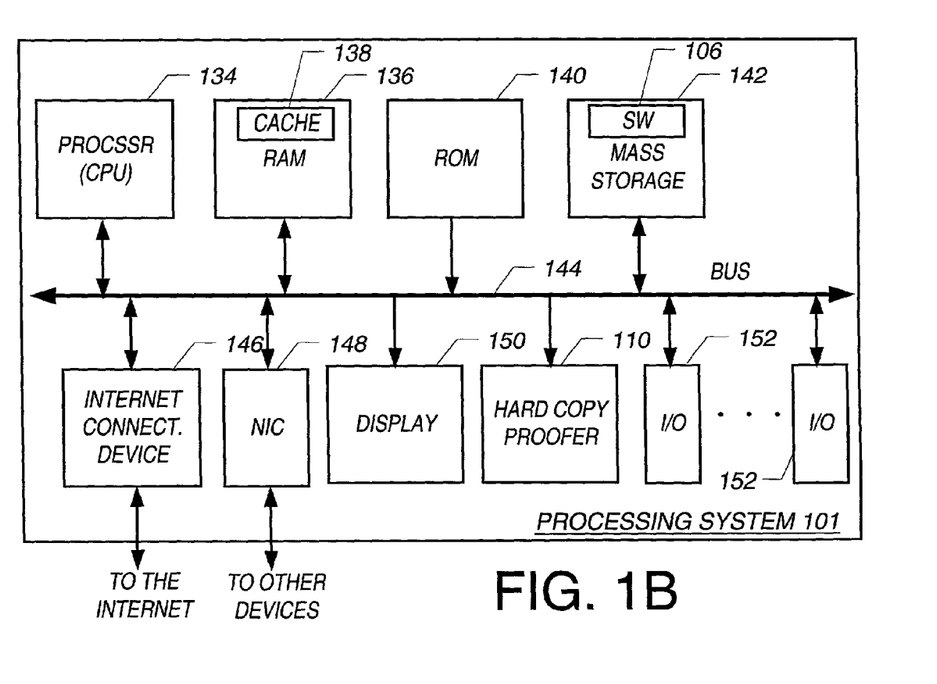
FIG. 1B shows a typical processing system in which an embodiment of the present invention may be implemented.

Referring to FIG. 1A, one embodiment is a proofing method 105 implemented as a computer program that runs on a computer processing 100 such as that shown in FIG. 1B. The computer program may be part of a computer software product (i.e., a carrier medium) 106 that includes one or more code segments 104 that cause a processor such as CPU 134 of processing system 100 to carry out the steps of the method 105. The program runs under an operating system 132, and may include a user interface (not shown) that enables a user to interact with the program. The proofing program 105 operates on an input file 103 and generates proofing data 108 that is input into a proofing device 110 to generate a proof 112.

The invention is not restricted to any particular type of output imaging including printing, nor to any type of input data. The input data need not be in the form of a PDL file. In one embodiment, the proofing method operates on an input image 103 that is post-separation, so includes components that are the color separations, each separation being a monochrome image. These separations may be in the form of the actual values of inks used for printing, or in the form of spot colors. The input 103 may include one or more multi-component images. Examples include images that have cyan, magenta, yellow, and black (CMYK) components, or more than four color components such as encountered in "Hi Fi" printing (e.g., 6 total separations), or may include spot colors or one or more special unconventional inks. Additionally, the image may be an indexed color image in which different colors are referred to by different indices.

The number N printing colorants for output imaging can be different from the number B of colors in the input 103. It is commonly known that in many cases, spot colors are converted to CMYK or other combinations of standard "process colors" (colorants) which need not be only 4 colors, e.g., six color "HI-FI" Hexachrome® colorant set from Pantone, Inc.

Figure 2:
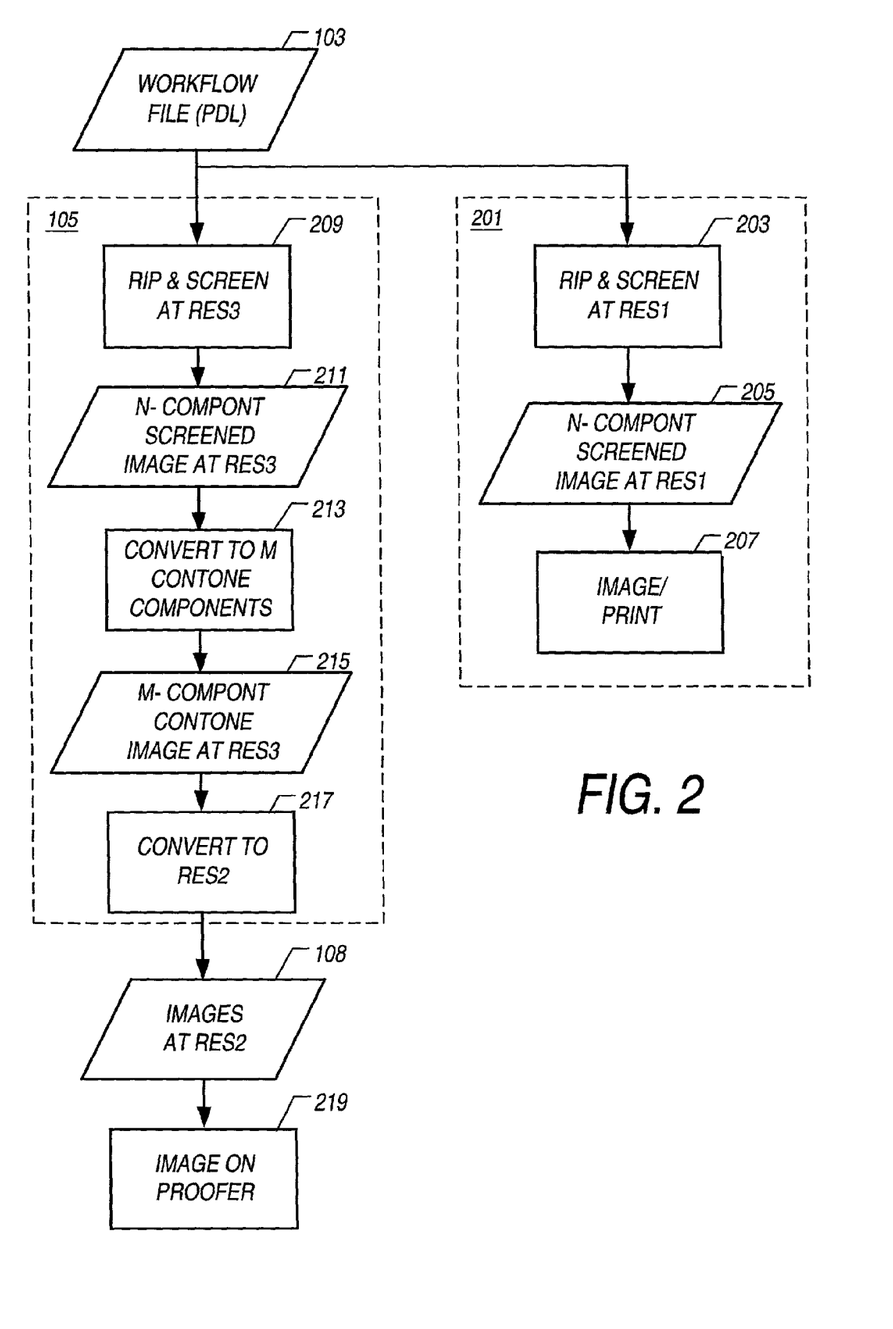
FIG. 2 shows a flowchart of a method embodiment of the present invention.

FIG. 2 shows a proofing method embodiment of the invention. The input 103 is shown here as a PDL file. The output imaging process is shown as process 201 and includes, for example in the case that the input 103 is a PDL file, RIPping and screening the input file 103 at a resolution RES1 to produce a screened image at a printing resolution RES1 with N binary color components at each pixel, for example in the form of N separations that may be N bitmaps each having binary (1 or 0) valued pixels. Output imaging 201 further includes imaging plates using the N-component screened image 205 (e.g., the N separations) directly or via film, and printing the final output using the N plates. The combined step of imaging and printing is shown as step 207. In some embodiments, the screened image 205 (e.g., as N bitmaps) is sent directly to the output device, while in other embodiments, the screened image 205 may be stored in a file.

One embodiment of the proofing method 105 includes in step 209 RIpping and screening the input 103 to produce an image 211 of N binary color components per pixel for each of the N printing colorants. In one embodiment, the RIPping/screening 209 produces N bitmaps. The resolution of the bitmaps is called the "intermediate resolution" and denoted RES3 herein. The intermediate resolution may be equal to or less than RES1, the resolution of the final printed output. In one embodiment, RES3 is less than 1000 dpi and RES1 is higher than 1000 dpi.

Step 209 of generating the N component screened image 211 (e.g., as N bitmaps) from an input 103 may be performed using any method, and such methods are known. The RIPping and screening would typically be similar to how the RIPping and screening step 203 of output imaging 201 would be performed. In one embodiment, the screening of step 209 includes dot gain compensation according to a dot gain compensation curve.

Some differences between steps 209 and 203 may include:
1. Step 203 may produce the output 205 that is sent directly to the output device, while the output of step 209 may be an electronic file containing the N component screened image. When in the form of N bitmaps, the file format of the bitmaps 211 can be any bitmap format, and in one embodiment is TIFF G4.
2. Dot gain compensation according to dot gain curves is typically used in screening and the dot gain compensation for step 203 may be different than those used in proofing step 209 (see below).

Note that in some embodiments the input may be a set of screened bitmaps rather than a PDL file 103. This is the case, for example in a so-called copydot workflow. In one such embodiment, RES3=RES1, and the proofing method starts with the N bitmaps at RES3 211 as input, and step 209 is not performed. Similarly, the output imaging 201 starts with N bitmaps at RES3 211 as input. That is, screened images 205 and 211 are identical.

In another embodiment, the input may be a set of bitmaps resulting from scanning a hard copy (photograph and/or line art) at the resolution RES3 using a scanner that produces screened output.

The N color components produced in step 209 substantially correspond to the N printing colorants. Furthermore, the screen of the screened image 211 is designed to be substantially the same as the screen of the screened image 205 of the output imaging process 201. This may be achieved, for example by the screening process used in step 209 being substantially the same as the screening process of step 203 in the output imaging. Thus, the data 211 contains all the information needed for making a good screened proof. The resolution RES3 may be the same, or lower than the printing resolution RES1. It may even be higher than RES1, although in practice there would be no advantage since RES3 equal to RES1 provides optimal results.

In step 213, the N component screened image 211 is converted to a continuous-tone (contone) image 213 with the same number, denoted M, of color components as there are proofing color components. The resolution of contone image 213 is RES3, the same as the resolution of the screened image 211. In one embodiment, the M colors of the proofer are the same number and the same colorants as the N printer colors. For example, both the printer and the proofer use the same CMYK colorants. This however is not the case in general. The more likely situations that embodiments of the invention can handle include:

M is smaller than N. For example: M is 4, say CMYK, and N is more than 4, say CMYK process colors and in addition some spot colors that are not converted to CMYK.

M is equal to N but the set of printer colorants is different than the proofer color components. One example is proofing of CMYK data on a "CMYK" proofer that uses inks that differ from the final printing inks, In this case, step 213 includes "re-separation," i.e., determining new values for the screen percentages of C, M, Y and K.

M is larger than N, for example proofing of a set special colors. Consider, for example an input image 103 with C, Warm Red, Yellow and Brown that is to be proofed on a six-color (e.g., Hexachrome®) proofer that has CMYK, green and orange.

The result of step 213 is one contone image 215 at the same resolution RES3, where each pixel has M components. In practice, this can be represented as one contone image file 215 comprising M components or M separate contone images 215 each of one component.

The proofing device may be a continuous tone proofing device, a binary output (screened) proofing device, or a computer monitor for soft proofing. In each of these cases, the contone image 215 may need to be converted in step 217 to suitable output at the proofing resolution RES2.

In the case of a continuous tone proofer, the resolution RES3 is typically different than the proofer resolution RES2. Step 217 includes converting to a contone image at resolution RES2, for example by resampling.

In the case that the proofer is a screened device, i.e., it only allows binary input values (e.g., 0 or 1) for the M components at each pixel, step 217 of converting the contone image 215, in one embodiment includes converting the resolution of (e.g., resampling) the contone image 215 to the proofer resolution RES2 and screening each of the RES2-resolution contone pixels to produce output 103 at resolution RES2 for proofer 110.

In the case that the proofer is a computer monitor such as display 150 of processing system 101 (FIG. 1B), the output of conversion step 213 is the set of display color components, e.g., the three components R, G, and B. Since it is sometimes desirable to zoom in and out without losing too much of the imaging properties, a resolution conversion step 217 may be included to produce rescaled display input values.

The RIPping and Screening

In one embodiment, step 209 of RIPping/Screening uses substantially the same screen as the screen of the RIPping/Screening 203 for the final printing, except that the intermediate resolution RES3 may differ from the printing resolution RES1.

While the best quality proofing is obtained when the two resolutions RES3 and RES1 are the same, it may be desirable, for example for speed reasons, to work with a lower intermediate resolution RES3. For example, RES3 may be half the printing resolution, or RES3 may be a multiple of the proofer resolution, or RES3 may even be the same as the proofer resolution RES2 if that resolution is high enough to provide representative screens. Thus, in general, RES3 is high enough to provide screens that are representative of the final printing screens.

The N-component screened image (e.g., N bitmaps) is generated in step 209 in a representative way. By a representative way is meant that the N colorants are substantially the same as the N printing colorants of the output imaging process, and the screen properties are substantially matched. Substantially matching the screen properties includes generating a screen with substantially the same halftone screen characteristics at the intermediate resolution RES3 as at the printing resolution RES1. In one embodiment, substantially the same halftone screen characteristics means that the screen rulings differ by 5% or less, the screen angles differ by 1% or less, the dot shape for each separation is substantially the same as that of the screen on the final print for the separation. In many situations, the halftone screen characteristics of the final print are known, for example because a user knows the characteristics of process 203, or outputs of screening process 203 are available for measurement and analysis. How to substantially match screening properties for different types of screens is known to those of ordinary skill in the art. For example, irrational screening, a method generally known to those of ordinary skill in the art, is able to match ruling, angle and dot shape very precisely to conventional halftone methods. In those cases where irrational screening is not available for step 209, or is not practical, for example because the process is too slow, supercell screening may be used. Methods to calculate supercell screens that substantially match rulings, angles and dot shapes may be found, for example, in U.S. Pat. No. 5,235,435 entitled METHOD OF PRODUCING HALFTONE SCREENS (issued Aug. 10, 1993) and in European patent publication EP-0 583 776 entitled A HALFTONE SCREEN GENERATOR, HALFTONE SCREEN, AND METHOD FOR GENERATING SAME (published Jan. 7, 1999). U.S. Pat. No. 5,235,435 and European patent publication EP-0 583 776 are both incorporated herein by reference.

The Conversion to a Contone Image

In one embodiment, the conversion step 213 includes color management, and uses a look-up table with $2^N$ inputs, with each input representing one of the possible combinations of 100% overlaps of the N components of screened image 211. These $2^N$ combinations are known in color science as the Neugebauer primaries. Table 1 is an example of such a look-up table with N=3 (Cyan C, Magenta M and one spot color "spot1"), M=4 and the M=4 proofer colors are CMYK for a proofer. The outputs of Table 1 are shown as numbers between 0 (corresponding to 0% coverage of a colorant) and 1 (representing 100% coverage of a colorant). Note that the Cyan and Magenta on the separations in this example are not in general the same as the Cyan and Magenta on the proofer. That is a typical situation since printing inks typically have different reflection spectral characteristics (and thus CIE-Lab values) than proofer inks or toners.

TABLE 1

| INDEX | nothing (000) | C (001) | M (010) | C + M (011) | spot1 (100) | C + spot1 (101) | M + spot1 (110) | C + M + spot1 (111) |
|---|---|---|---|---|---|---|---|---|
| C | 0 | 0.9 | 0 | 1 | 0.6 | 0.93 | 0.6 | 1 |
| M | 0 | 0.1 | 1 | 1 | 0 | 0.12 | 1 | 1 |
| Y | 0.03 | 0.03 | 0.03 | 0.05 | 0.5 | 0.55 | 0.5 | 0.4 |
| K | 0.03 | 0.03 | 0.1 | 0.2 | 0.1 | 0.14 | 0.4 | 0.8 |

Since all input pixels of the N-component binary image 211 have one of the $2^N$ combinations, the M colorant values for each of the input pixels can be determined by a look-up of look-up table. Using a look-up table provides for conversion of any combination to any set of any values, e.g., between 0 and 1, so provides for any conversion method including very "wild" or very conservative conversions. Most interesting of course are conversion methods that have some desirable properties. One desirable property is color matching, so in one embodiment, the look-up table of the conversion step 213 provides a substantial color match between the proofer and the final printing press.

Color matching conversion look-up tables can be generated using methods known in the art of color management, including, but not limited to the method described in European Patent publication EP 0 501 942 entitled A METHOD AND A DEVICE FOR CONVERTING A COLOR COORDINATE SET, incorporated herein by reference, or that described in U.S. Pat. No. 5,689,349, entitled METHOD AND DEVICE FOR GENERATING PRINTING DATA IN A COLOR SPACE DEFINED IN NON STANDARD PRINTING INKS, also incorporated herein by reference.

In one embodiment, to generate a color matching conversion table, one starts with a color profile of the proofer. The proofer profile provides for converting any proofer ink combination into device independent color values (CIE-Lab, CIE-XYZ, etc.). The proofer profile can be described in a format such as specified for device profiles by the International Color Consortium (ICC at www.color.org).

The printed colors of the $2^N$ Neugebauer primaries are now determined. This can be done with a test image containing patches with the $2^N$ Neugebauer primaries. This test image is printed on the final press (e.g., steps 203, 205 and 207 are carried out) and the printed $2^N$ patched are measured with a colorimeter or photospectrometer. The measurements are converted to the same device independent color space as used for the proofer profile.

Note that the number of colors patches requiring measurement for the color management in conversion step 213 is much smaller than usually required in conventional color management methods. The number of patches for example is much smaller than required in the prior-art method described in U.S. Pat. No. 5,781,709.

Alternatively, the colors of the $2^N$ Neugebauer primaries can be calculated using an overprint model such as that described in above mentioned European patent publication EP-0 501 942 or above-mentioned U.S. Pat. No. 5,689,349.

For each of the $2^N$ Neugebauer primaries, a combination of the proofer colors that provides a close match is determined according to a close match criterion. One close match criterion is a mathematical nearest fit that minimizes the Euclidian distance delta E between proofer colors and the measured Neugebauer primary colors in the device independent color space. Other "close match" criteria also may be used. One alternate embodiment uses a nearest fit mechanism that favors the appearance of zeros in the table. Another alternate embodiment uses a nearest fit mechanism that minimizes the total ink coverage in the table. Other criteria also are possible.

For example, in one embodiment, if the N printing colorants comprise both process colors and standard colors such as Pantone® colors, and the M output color components are CMYK, the combination table is found as a one to one match for CMYK, as a Pantone® to CMYK conversion for the non-overprinting standard (e.g., Pantone®) colors, and by means of a mathematical calculation for a more complicated combination according to an overprint modeling.

Using the conversion look-up table, the N-component binary image 211 is converted in step 213 into one contone image 215 with M color components, or equivalently into M contone images 215 of one color component each.

In one embodiment, the conversion includes:

1. Scanning each of the N input bitmaps pixel by pixel (typically in rows or columns but any other sequence would work). Pixels located on the same place on each input bitmap are hereinafter called "corresponding pixels." Each corresponding pixels of the bitmaps thus defines N binary (0 or 1) values. These N values are concatenated to a binary N-bit number called INDEX herein, whose least significant bit is the 1 or 0 value of the first separation, the second bit is the 1 or 0 value of the second separation, and so forth.
2. The number INDEX is the input entry in the conversion table, and is used to index the look-up table of length $2^N$ with M outputs. Each table output provides the screen percentage of the output color component for input value INDEX. In one embodiment, the screen percentage is provided as an integer, for example, an 8-bit integer between 0 and 255. In another, the screen percentage is provided as a number between 0 and 1, and scaled to an 8-bit integer between 0 and 255. These M screen percentages form the contone values per pixel of the contone image 215 at the intermediate resolution RES3.

Other ways to combine the N binary values to a number INDEX may be used. For example, the most rather than least significant bit may be the 1 or 0 value of the first separation, and so forth.

Note that contone image 215 may be too large to store. However, as described below, not all of image 215 needs to be stored.

According to one embodiment, the RIPping and screening step 209, the converting step 213 and the resolution conversion step 217 are done line by line or in slices of SCALE lines in order to avoid intermediate storage of the complete image 215 resulting from the RIPping and screening step or the converting step, where SCALE is the first integer bigger than or equal to the ratio RES3/RES2. This is described in more detail below.

Preparing the Output to the Proofer

A Contone Proofing Device

In general, the resolution RES3 of contone image 215 is not the same as the resolution RES2 of the proofing device 116. In such a case, step 217 then includes changing the resolution, for example by resampling. Many methods of resampling are known in the art. In one embodiment, to avoid excessive quality loss, the resolution change uses an anti-aliasing interpolation technique. Any anti-aliasing interpolation method may be used. One embodiment uses the interpolation method described below. Each component is assumed to have an 8-bit input value (i.e., between 0 and 255) as is common, and the method is easily adapted for other input images.

1. Determine the first integer number larger than or equal to RES3/RES2. This integer is called SCALE herein.
2. Assuming equal resolution in each direction, consider a SCALE pixel by SCALE pixel square window at the intermediate resolution RES3, and form a moving average over the window for each color component. That is, for each color component, add the values of the pixels covered by the window and divide the sum by (SCALE)$^2$. The result is a value between 0 and 255 and is the value of the pixel of the color component of image 108 at the proofer resolution RES2 that is closest to the center of the SCALE by SCALE window.
3. The window is moved across the contone image 215, for example row by row, moving in steps of SCALE pixels at a time. In this way, all pixels of the needed RES2 image 108 are generated.
4. The resulting image 108 is imaged on the proofer.

In one embodiment, the moving average process may be improved upon in the case that RES3/RES2 is not an integer value. In that case, the moving average can be weighted in order to give lower weights to the input pixels of image 215 that only partially overlap a pixel of image 108. Many weighting policies are possible. One simplest policy is to take a weight 1 if the RES3 pixel is fully overlapped by the RES2 pixel and a pro-rated value when the overlap is only partial.

It should be noted that changing the resolution of images is a well-studied problem in the graphic arts and image processing industry, and many adequate techniques are available. Computer programs such as Adobe Photoshop® (Adobe Syetems, San Jose, Calif.) include such procedures.

It will be clear to the reader that the present invention does not depend on any particular scaling method being used in step 217.

Note that some "continuous tone" output devices are not true continuous tone devices. Such devices accept contone images as input, and internally screen the input image to a micro-pattern. Such a device is referred to as a "pseudo-continuous tone" proofer. Proofing on such a device includes a screening effect, so it is desirable to avoid interference between the micro-pattern of such a pseudo-continuous tone device, and the halftone screening of step 209 that may be present in the contone image 215. If possible, the micro-pattern of the proofer should be stochastic. Most pseudo-continuous tone printing devices allow one to select stochastic patterns for the micro-pattern. For some such printers, the only micro-patterns possible are stochastic patterns.

It should be noted that it is not necessary to store complete images such as images 211, 215, and 108 in the proofing method 105. Consider, for example, proofing a high-resolution image of size 20 inches by 20 inch at an intermediate resolution RES3 of 2400 dpi. A complete contone image 215 has 20*20*2400*2400=2.14 Gbyte per one-byte output color component, or over 8 Gbyte for four colors. It may be impractical to store such a complete image. In one embodiment, enough rows of the contone image 215 are buffered to allow calculating (step 217) one row of the output 108 at the proofer resolution RES2. Using the above resampling method, this is SCALE lines of image 215. Thereafter, there is no need to keep the intermediate high-resolution contone pixels of image 215. For example, if the proofer resolution RES2 is 300 dpi, integer SCALE is 8, and an image of 20 inches by 20 inches at 2400 dpi will only require 20*2400*8=375 kbyte for temporary storage of SCALE lines of a color component of image 215. This brings the memory requirements to a reasonable level even with today's modest technology.

A Screened Proofing Device

A screened proofing device only allows two values (e.g., 0 or 1) for each color component. To convert the contone image 215 at to a screen at the proofer resolution RES2, the resolution conversion step 217 in one embodiment includes:

1. Resampling the contone image 215 to the proofer resolution RES2. The resampling can be assisted by anti-aliasing to avoid excessive quality loss. The resampling in step 217 will not seriously affect the quality of the final proof if the proofer resolution RES2 is sufficiently high. In practice, we have found that 600 dpi or more provides sufficient quality for any screen ruling higher than 100 lines per inch (lpi). This should not be a practical limitation. Today, even inexpensive consumer-oriented color ink-jet printers provide at least 600 dpi output.
2. Screening the contone pixels at resolution RES2, preferably with a stochastic screening technique.

One embodiment uses a threshold array containing a stochastic screen for the screening in step 217. Threshold arrays describing stochastic screens are known in the art. One embodiment uses the blue noise array described in U.S. Pat. No. 5,543,941 entitled METHOD AND APPARATUS FOR HALFTONE RENDERING OF A GRAY IMAGE USING A BLUE NOISE MASK (issued Aug. 6, 1996), incorporated herein by reference. Other methods also are known and can be used. The threshold arrays can describe stochastic screens with dispersed dot or with clustered dot.

Dispersed dot stochastic screens make use of dots each the size of a proofer pixel. Clustered dot stochastic screening combines several different proofer pixels to form one halftone dot. Clustered dots are easier to print, but the output may have a rougher appearance than with dispersed dots. The choice is dependent on the properties of the output process. Dispersed dots provide the best rendering, but require a proofer able to properly print small dots. In practice, dispersed dot methods work with proofers of resolution no more than 1000 dpi. Higher resolutions typically demand clusters of at least 2 by 2 pixels. With very high resolution, these dots will still be not very apparent compared to the real screen.

In one embodiment, the rows of screened input data 211 are read and generate screened output at proofer resolution on-the-fly. In one embodiment, the intermediate resolution (RES3) contone image 215 is kept in memory only until there is enough information to generate the proofer resolution contone image. Furthermore, the intermediate contone image at the proofer resolution is screened as soon as possible. Since screening is a local operation, this process can be carried out immediately, so that in one embodiment, the resampling and the screening of step 217 are combined in one single step.

A Color Monitor Soft Proofer

In one embodiment, the proofer is a printing device, outputting physical sheets of paper or other material where a colorant is applied in M base colors with subtractive color mixing. In another embodiment, the proofer is not a physical printer but a display device such as an RGB computer display shown as display 150 in FIG. 1B. In that case, M (the number of output colors) is typically equal to 3: Red, Green and Blue.

The conversion step 213 in one embodiment uses a look-up table with $2^N$ inputs, with each input representing one of the possible combinations of 100% overlaps of the N components of 211. Table 2 is an example of such a look-up table with N=3 (Cyan C, Magenta M and one spot color "spot1"), M=3 and the 3 output colors are additive RGB. The outputs are shown as numbers between 0 (corresponding to 0 intensity of a display input, e.g., a CRT gun) and 1 (representing 100% intensity modulation of a display input, e.g., a CRT gun).

TABLE 2

|   | nothing (000) | C (001) | M (010) | C + M (011) | spot1 (100) | C + spot1 (101) | M + spot1 (110) | C + M + spot1 (111) |
|---|---|---|---|---|---|---|---|---|
| R | 0.93 | 0 | 1 | 0 | 0.1 | 0 | 0.9 | 0 |
| G | 0.93 | 1 | 0 | 0 | 0.9 | 0.83 | 0 | 0 |
| B | 0.9 | 1 | 1 | 1 | 0.2 | 0.15 | 0.17 | 0.13 |

Step 213 in an embodiment for display output is similar to the above-described conversion for a hard copy proofer, except that the conversion look-up table provides RGB values. That is, the conversion 213 includes:

Scanning each of the N input bitmaps pixel by pixel, typically in rows or columns. These N binary values for any pixel are concatenated to form the binary N-bit number INDEX, whose least significant bit is the 1 or 0 value of the first separation, the second bit is the 1 or 0 value of the second separation, and so forth.

Looking up the RGB value for each pixel by using the number INDEX to index the look-up table of length $2^N$ with RGB outputs. Each table output provides the RGB values of current pixel at resolution RES3.

In one embodiment, the computer screen has the same resolution RES3 as the intermediate output. This, for example, may be the same as the printer resolution RES1. Resolution conversion step 217 is then not required.

In an improved embodiment for soft proofing on a computer display, the ability to zoom in and out without losing too much of the imaging properties is provided. The zooming is carried out by step 217 or resampling the determined RGB values 215 to a different resolution RES2. This resampling may use an anti-aliasing interpolation technique as described above for the case of outputting to a printing proofer. To do this, step 217 buffers SCALE rows of RGB pixels 215 in memory. The RGB values are considered in blocks of SCALE*SCALE pixels and the moving average of R, G, and B calculated. This moving average image 108 at resolution 108 is sent in step 219 to the computer display 150 for proofing. In one embodiment, SCALE is the first integer bigger than or equal to RES3/RES2. As in the printing proofer case weighting can be used in the moving average process.

A Film Based Proofing Process

In another embodiment, the proofer is a screened proofer that uses an imagesetter for exposing films together with a film based proofing process such as one that uses a special proofing sheet like Cromalin®, or even a regular press with different colorants than the colorants on the final press of the output imaging process. In such an embodiment, the proofing device incoudes a film based imagesetter, which may even be the same imagesetter that is used in the final imaging process. Conventional film based proofing process or printing process can then take place. Note that by an imagesetter is meant any device for exposing films for screened output.

In the case of using conventional special output films such as Cromalin, using the invention enables making accurate CMYK proofs of spot colors that inclde color matching and that accurately proof screening properties. This provides far faster, cheaper, and convenient spot color proofing than how spot colors are now proofed on special proofing sheets. Prior art techniques, for example, may require the spot colors to be mixed from powders and brushed by hand on the substrate. The method described herein avoids having to carry out this tedious process because the spot colors are proofed directly on the exposed CMYK films. Screens and colors are substantially matched for the spot colors.

Dot Gain Compensation

When the dot gain of the proofing process (method 105 and step 219) and the printing process (steps 203, 205, and 207) is equal, the same dot gain compensation may be used in both processes. In general, the proofing process and the printing process may have different dot gain. For example, in flexography printing, there may be significant differences between printing press and proofer dot gains. If the printing press has high dot gain and the proofer has low dot gain, the result on the proof will be too light if both start from the same bitmaps.

Thus, in one embodiment, different bitmaps are used for generating the proofer output than for the printing press outputs. Both bitmaps are generated from the same source, but different dot gain compensation curves.

Note that film-based (non-digital) proofing processes such as conventional Cromalin®. also typically require generating different bitmaps than for printing to account for different dot-gain compensation.

Properties of the Proof

Proofs were produced using the above-described embodiments of the invention and compared to the prints. The perceived screens on the proof were found to compare favorably to the screens on the final print. In particular:

The angles were substantially equal.

The screen rulings were equal if the resolution RES3 of the N bitmaps 211 was the same as the printing resolution RES1 used for the printing plates. This might be the case, for example if the same bitmaps are proofed as are to be printed. Else, screen rulings were substantially the same given the screening software used. With known screening methods such as irrational screening, matches as close as 0.1% were achievable.

Dot shapes appeared the same to the naked eye. This may be because the dots are resampled versions of the dot shapes that are substantially matched.

The color matching was to have the following properties:

Process color matching was as good as that of screened proofer devices such as Kodak's Approval® proofer.

Unscreened spot colors had a color match if they were in the color gamut of the proofer colors.

Screened spot colors both preserved screening properties and matched in color.

Overprints of spot colors and CMYK showed an overprint of screens. Moiré petterns and rosettes were visible depending on how well the screen angles were chosen. The Moiré patterns and rosettes were correctly predicted. The overprint color was a very good approximation of the real overprint. In the case where overprints of the colors were within the gamut of the output color space, the resulting color would be the nearest match possible. All other colors had close match properties if their separations' 100% values were within the gamut of the output colors. This may be because the physical overprinted result in reality is an integration of the local effects.

Since in the above-described look-up table embodiment, all possible combinations are an entry in the color conversion look-up table, there is also an entry for no ink at all (all 0). As can be seen in the example Table 1 above, the output color components need not necessarily all be 0 in this situation. The found values represent the background color of the printing substrate. In some cases, like brown boxes, papers with a yellow shine or metallic substrates (aluminum for example), this property is extremely advantageous. Also the overprints with the substrate will be correctly measured by the color measuring device (colorimeter or spectrophotometer) and thus correctly proofed.

The method described is an extremely good match in case all Neugebauer primaries can be sufficiently matched within the gamut of the proofer. Recent proofers seriously extended their gamuts, so it is fair to say that this supposition will be fulfilled for most commercial inks. Possible exceptions would be fluorescent inks or metallic inks.

In this description, a number (RES1, RES2, RES3, 1000 dpi, 2000 dpi, etc.) is sometimes used to denote a resolution. For a raster output device, this typically means the resolution in the direction of the raster. The resolution in the other, typically orthogonal direction may or may not be the same.

One implementation of the proofing method as software operating in a standard processing system allows high speed and low memory requirements. The look-up table can clearly be kept in memory and so can all intermediate data. Memory requirements are typically below 10 Mbyte. The number of operations per pixel is modest. Organizing the bits of bitmaps 211 into an index and using the index as an entry in a look up table, for example, speeds up the look-up. Further speed-ups are possible by directly organizing the raster image processor (RIP) output as indices for the look-up table.

In another embodiment, the look-up table is implemented as a hardware circuit for improved speed.

Figure 3:
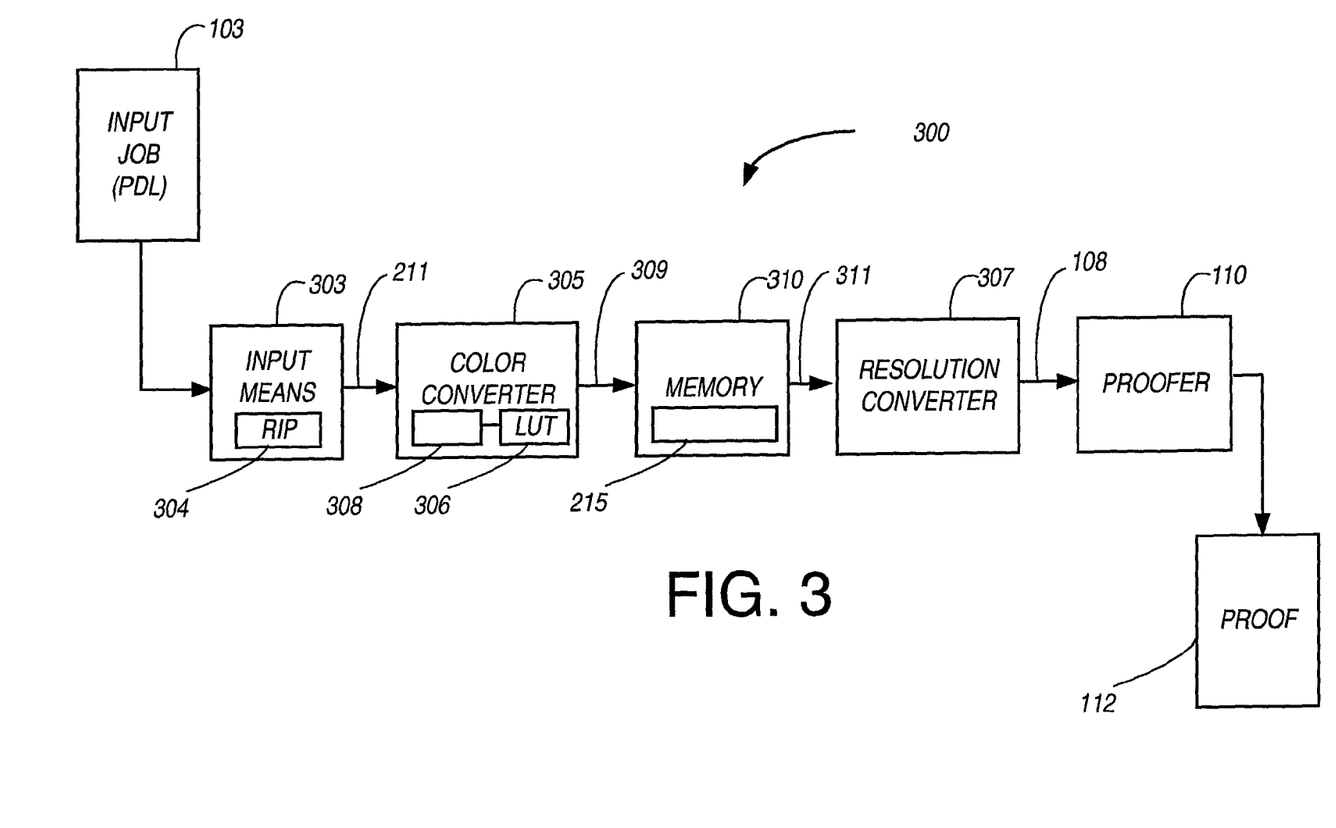
FIG. 3 shows an apparatus embodiment of the present invention.

FIG. 3 shows one apparatus embodiment of the invention. The apparatus includes input means to provide the N-component RES3 screened image 211 of the input 103. When the input 103 is a PDL file, in one embodiment, the input means includes a RIP 304 to RIP and screen the PDL file to provide the screened image 211. The apparatus also includes a color converter to convert the N-component RES3 screened image 211 to the M-component RES3 contone image 215. The color converter, in one embodiment, uses a look-up table (LUT) 306 that converts the data of a pixel of screened image 211 to the M components of the corresponding pixel of contone image 215. The LUT also includes a mechanism 308 coupled to the look-up table to concatenate the set of N binary values of a pixel of image 211 to form an N-bit binary number INDEX, and to index the look-up table 306 using INDEX. The apparatus further includes a resolution converter 307 to convert the RES3 contone image 215 to a RES2 M-component contone image. When the proofer is a contone proofer, in one embodiment the output of the resolution converter 307 is the proofer data 108 which is output to the proofing device 110 to produce a proof 112. In one embodiment, the apparatus includes a memory 310 for storing at least SCALE lines of the M-component contone image 215.

The computer system 101 shown schematically in FIG. 1B is a processing system that typically has a configuration of one or more standard computer systems (in general "processing systems"). A typical processing system 101 may include a bus 144, processing unit (processor, CPU) 134, memory (e.g., random access memory, RAM) 136, read only memory (ROM), a cache 138, a mass storage device 142, an Internet interface, a network interface card (NIC) 148, a display, and various other input/output devices. The mass storage device 142 may include a magnetic, optical, or other equivalent storage medium. The Internet connection device 146, if included, may be any device used to connect to the Internet, and exemplary connection devices include, but are not limited to: a modem, a digital subscriber line (DSL) modem, a cable modem, an optical connection device, a T1 interface, a T3 interface, an E-1 interface and an E-3 interface. The input/output devices may include a pointing device such as a mouse and a keyboard.

A data processing system such as processing system 101 also may include application programs, operating systems, data, etc., which are not shown in FIG. 1B for the sake of clarity. It also will be understood that such a data processing system may also include numerous elements not shown, such as disk drives, keyboards, display devices, network connections, additional memory, additional processing units, LANs, input/output lines, etc. For example, the processing system 101 may actually include multiple physical and logical devices connected in a distributed architecture. Accordingly, the network interface card 148 is used to provide data communication with other devices that are part of processing system 101.

A hard copy proofing device 110 is shown in FIG. 1B as part of processing system 101. In some embodiments, the proofing device is outside processing system 101. In other embodiments, a processing system that implements a proofing method embodiment of the present invention is part of a proofing device.

As will be appreciated by those skilled in the art, embodiments of the present invention may be embodied as a method, an apparatus such as a special purpose apparatus, an apparatus such as a data processing system, or a carrier medium, e.g., a computer program product, carrier medium carrying one or more computer readable code segments for controlling a processing system to carry out a set of steps. Accordingly, the present invention may take the form of an entirely hardware embodiment, an entirely software embodiment or an embodiment combining software and hardware aspects. Furthermore, the present invention may take the form of carrier medium (e.g., a computer program product on a computer-readable storage medium) carrying computer-readable program code segments 104 embodied in the medium. Any suitable computer readable medium may be used including a magnetic storage device such as a diskette or a hard disk, or an optical storage device such as a CD-ROM. For example, FIGS. 1A and 1B show a computer program product 106 as part of mass storage device 142, the computer program product having computer-readable program code segments 104.

It will be understood that the steps of methods and flowcharts discussed are performed in one embodiment by an appropriate processor such as processor 134 of the processing system shown as processing system 101 executing instructions (code segments) 104 stored in storage 142. It will also be understood that the invention is not limited to any particular implementation or programming technique and that the invention may be implemented using any appropriate techniques for implementing the functionality described herein. The invention is not limited to any particular programming language or operating system.

The instructions (e.g., computer readable code segments 104 in storage 142) may be read from storage into memory 136. Execution of sequences of instructions contained in memory 136 causes processor 134 to perform the process steps described herein. In alternative embodiments, hard-wired circuitry may be used in place of or in combination with software instructions to implement the invention. Thus, embodiments of the invention are not limited to any specific combination of hardware circuitry and software.

The terms "carrier medium" and "computer-readable medium" as used herein refer to any medium that participates in providing instructions to a processor such as processor 134 for execution. Such a medium may take many forms, including but not limited to, non-volatile media, volatile media, and transmission media. Non-volatile media includes, for example, optical or magnetic disks, such as a storage device which is part of mass storage 142. Volatile media includes dynamic memory such as RAM 136. Transmission media include coaxial cables, copper wire and fiber optics, including the wires that comprise a bus within a computer, such as bus 144. Transmission media can also take the form of acoustic or light waves, such as those generated during radio wave and infra-red data communications.

Common forms of computer-readable media include, for example a floppy disk, a flexible disk, a hard disk, magnetic tape, or any other magnetic medium, a CD-ROM, any other optical medium, punch cards, paper tapes, any other physical medium with patterns of holes, a RAM, a PROM, an EPROM, a FLASH-EPROM, any other memory chip or cartridge, a carrier wave as described hereafter, or any other medium from which a computer can read.

Various forms of computer readable media may be involved in carrying one or more sequences of one or more instructions to a processor for execution. For example, the instructions may initially be carried on a magnetic disk of a remote computer. The remote computer can load the instructions into its dynamic memory and send the instructions over a telephone line using a modem. A modem local to the computer system can receive the data on the telephone line and use an infrared transmitter to convert the data to an infra-red signal. An infra-red detector coupled to a bus can receive the data carried in the infra-red signal and place the data on the bus. The bus carries data to main memory, from which a processor retrieves and executes the instructions. The instructions received by main memory may optionally be stored on a storage device either before or after execution by a processor. The instructions can also be transmitted via a carrier wave in a network, such as a LAN, a WAN, or the Internet.

There have been described herein what are believed to be the preferred embodiments of the invention. Those skilled in the art will recognize that other and further modifications may be made thereto without departing from the spirit of the invention, and it is intended to claim all such changes and modifications as fall within the scope of the invention.

The invention claimed is:

1. A method to proof an input image for output imaging by an output imaging process with N colorants at a printing resolution RES1, the proofing on a proofer having M proofer color components at a proofing resolution RES2, at least one of the M proofer color components being different from any of the N printing colorants, the output imaging including screening, the method comprising:

providing a screened image of N color components at a resolution RES3 that represents the input image, the N color components of the RES3 screened image substantially the same as the N printing colorants of the output imaging process, and the screening of the RES3 screened image having substantially the same properties as the screening of the output imaging process;

converting the N-color-component screened image at the resolution RES3 to a contone image of resolution RES3 having a number denoted M of contone color components; and converting the M-color-component contone image at the resolution RES3 to an M-color-component contone image at the proofing resolution RES2.

2. A method as described in claim 1, wherein RES3 is the same as RES1, and wherein the input image is the RES3 N-color-component screened image.

3. A method as described in claim 1, further comprising outputting the RES3 M-component contone image on the proofer.

4. A method as described in claim 3, wherein the proofer is a screened proofer and the outputting makes use of a screening process.

5. A method as described in claim 4, wherein the proofer includes an imagesetter for exposing films, and wherein the M proofer colorants are C, M, Y, and K.

6. A method as described in claim 4, where the screening process of the outputting is a stochastic screening process.

7. A method as described in claim 1, wherein the input image is a PDL file and wherein the step of providing the RES3 N-color-component screened image includes RIPping and screening the PDL file to form the RES3 N-color-component screened image, the screening step substantially matching the screening of the output imaging.

8. A method as described in claim 7, wherein the screening of the RIPping and screening step include dot gain compensation.

9. A method as described in claim 1, wherein the number of proofer color components M is smaller than the number of output imaging color components N.

10. A method as described in claim 1, wherein the M proofer colorants are C, M, Y, and K.

11. A method as described in claim 10, wherein the proofer includes an imagesetter for exposing film, and wherein the input image may include one or more parts that require at least one non-CMYK ink in the output imaging process, such that any part of the image that requires at least one non-CMYK is proofed on the films, including substantial color and screening properties matching.

12. A method as described in claim 1, wherein the M proofer colorants are R, G, and B and the proofer is a display screen.

13. A method as described in claim 1, wherein the intermediate resolution RES3 is less than 1000 dpi and the printer resolution RES1 is higher than 1000 dpi.

14. A method as described in claim 1, wherein the intermediate resolution RES3 is the same as the printer resolution RES1.

15. A method as described in claim 1, including storing a number SCALE of lines of the M-component contone image, SCALE being the first integer greater or equal to the ratio RES3/RES2.

16. A method as described in claim 1, wherein the converting of the N-component screened image and the resolution converting of the M-component contone image are carried out line by line such that intermediate storage of the complete M-component contone image is not required.

17. A method as described in claim 1, wherein the converting of the N-component screened image and the resolution converting of the M-component contone image are carried SCALE line at a time such that intermediate storage of the complete M-component contone image is not required, SCALE being the first integer greater or equal to the ratio RES3/RES2.

18. A method as described in claim 1, wherein the step of converting to a M-component contone image uses a look-up table to convert a set of N binary values to a set of M contone values.

19. A method as described in claim 18, wherein the look-up table has $2^N$ entries and M output values for each entry, and wherein the step of converting a set of N binary values to a set of M contone values includes:
concatenating the set of N binary values to form an N-bit binary number, and
indexing the look-up table using the N-bit binary number.

20. A method as described in claim 18, wherein the color determined by the imaging process for any region of the input image and the color constructed using the combination of proofer color components determined by the look-up table are substantially color matched.

21. A computer readable carrier medium carrying one or more computer readable code segments for controlling a processing system to carry out a method to proof an input image for output imaging by an output imaging process with N colorants at a printing resolution RES1, the proofing on a proofer having M proofer color components at a proofing resolution RES2, at least one of the M proofer color components being different from any of the N printing colorants, the output imaging including screening, the carrier medium comprising:
computer readable code to effect one or more processors of the processing system to accept a screened image of N color components at a resolution RES3 that represents the input image, the N color components of the RES3 screened image substantially the same as the N printing colorants of the output imaging process, and the screening of the RES3 screened image having substantially the same properties as the screening of the output imaging process;
computer readable code to effect one or more processors of the processing system to convert the N-color-component screened image at the resolution RES3 to a contone image of resolution RES3 having a number denoted M of contone color components; and
computer readable code to effect one or more processors of the processing system to convert the M-color-component contone image at the resolution RES3 to an M-color-component contone image at the proofing resolution RES2.

22. A carrier medium as described in claim 21, wherein RES3 is the same as RES1, and wherein the input image is the RES3 N-color-component screened image.

23. A computer readable carrier medium as described in claim 21, farther comprising
computer readable code to effect one or more processors of the processing system to output the RES3 M-component contone image on the proofer.

24. A computer readable carrier medium as described in claim 23, wherein the proofer is a screened proofer and the outputting to the proofer makes use of a screening process.

25. A computer readable carrier medium as described in claim 24, wherein the proofer includes an imagesetter for exposing films, and wherein the M proofer colorants are C, M, Y, and K.

26. A computer readable carrier medium as described in claim 24, where the screening process of the outputting is a stochastic screening process.

27. A computer readable carrier medium as described in claim 21, wherein the input image is a PDL file and wherein the code to accept the RES3 N-color-component screened image includes:
computer readable code to effect one or more processors of the processing system to RIP and screen the PDL file to form the RES3 N-color-component screened image, the screening substantially matching the screening of the output imaging.

28. A computer readable carrier medium as described in claim 27, wherein the screening of the RIPping and screening code include dot gain compensation.

29. A computer readable carrier medium as described in claim 21, wherein the number of proofer color components M is smaller than the number of output imaging color components N.

30. A computer readable carrier medium as described in claim 21, wherein the M proofer colorants are C, M, Y, and K.

31. A computer readable carrier medium as described in claim 21, wherein the M proofer colorants are R, G, and B and the proofer is a display screen.

32. A computer readable carrier medium as described in claim 21, wherein the intermediate resolution RES3 is less than 1000 dpi and the printer resolution RES1 is higher than 1000 dpi.

33. A computer readable carrier medium as described in claim 21, wherein the intermediate resolution RES3 is the same as the printer resolution RES1.

34. A computer readable carrier medium as described in claim 21, wherein the processing system includes a memory, the medium further comprising computer readable code to effect one or more processors of the processing system to store a number SCALE of lines of the M-component contone image in the memory, SCALE being the first integer greater or equal to the ratio RES3/RES2.

35. A computer readable carrier medium as described in claim 21, wherein the code to of convert to a M-component contone image includes code to fetch a set of M contone values for a set of N binary values of a pixel of the N-component RES3 screened image from a look-up table stored in the processing system, the look-up table having $2^N$ entries and M output values for each entry.

36. A computer readable carrier medium as described in claim 35, wherein the color determined by the imaging process for any region of the input image and the color constructed using the combination of proofer color components determined by the look-up table are substantially color matched.

37. An apparatus to proof an input image for output imaging by an output imaging process with N colorants at a printing resolution RES1, the proofing on a proofer having M proofer color components at a proofing resolution RES2, at least one of the M proofer color components being different from any of the N printing colorants, the output imaging including screening, the method comprising:
  input means to provide a screened image of N color components at a resolution RES3 that represents the input image, the N components of the RES3 screened image substantially the same as the N printing colorants of the output imaging process, and the screening of the RES3 screened image having substantially the same properties as the screening of the output imaging process;
  a color converter coupled to the input means to convert the N-color-component screened image to a contone image of resolution RES3 having a number denoted M of contone color components; and
  a resolution converter coupled to the proofer and to the color converter to convert the M-color-component contone image at the resolution RES3 to an M-color-component contone image at the proofing resolution RES2.

38. An apparatus as described in claim 37, wherein RES3 is the same as RES1, and wherein the input image is the RES3 N-color-component screened image.

39. An apparatus as described in claim 37, wherein the input image is a PDL file and wherein the means to provide the RES3 N-color-component screened image includes a RIP to RIP and screen the PDL file to form the RES3 N-color-component screened image, the screening substantially matching the screening of the output imaging.

40. An apparatus as described in claim 37, wherein the number of proofer color components M is smaller than the number of output imaging color components N.

41. An apparatus as described in claim 37, wherein the M proofer colorants are C, M, Y, and K.

42. An apparatus as described in claim 41, wherein the proofer includes an imagesetter for exposing films.

43. An apparatus as described in claim 37, wherein the M proofer colorants are R, G, and B and the proofer is a display screen.

44. An apparatus as described in claim 37, wherein the intermediate resolution RES3 is less than 1000 dpi and the printer resolution RES1 is higher than 1000 dpi.

45. An apparatus as described in claim 37, wherein the intermediate resolution RES3 is the same as the printer resolution RES1.

46. An apparatus as described in claim 37, further comprising a memory coupled to the color converter and to the resolution converter, the memory capable of storing at least a number SCALE of lines of the M-component contone image, SCALE being the first integer greater or equal to the ratio RES3/RES2.

47. An apparatus as described in claim 37, wherein the image converting includes a look-up table to convert a set of N binary values to a set of M contone values.

48. An apparatus as described in claim 47, wherein the look-up table has $2^N$ entries and M output values for each entry, and wherein the color converter includes:
  a mechanism coupled to the look-up table to concatenate the set of N binary values of a pixel to form an N-bit binary number, and to index the look-up table using the N-bit binary number.

49. An apparatus as described in claim 47, wherein the color determined by the imaging process for any region of the input image and the color constructed using the combination of proofer color components determined by the look-up table are substantially color matched.

50. A method to proof an input image for output imaging by an output imaging process with N colorants at a printing resolution RES1, the proofing using a film based proofing or printing process having M color components at a resolution RES2, at least one of the M proofer color components being different from any of the N final printing colorants, the output imaging including screening, the method comprising:
  providing a screened image of N color components at a resolution RES3 that represents the input image, the N color components of the RES3 screened image substantially the same as the N colorant components of the output imaging, and the screening of the RES3 screened image having substantially the same properties as the screening of the output imaging;
  converting the RES3 N-color component screened image to a contone image of resolution RES3 having M contone components; and
  converting the RES3 M-color component contone image to an M-color component contone image at the proofing resolution RES2.

51. A method as described in claim 1, wherein the screens of the RES3 screened image have
  screen rulings that differ by at most 5% from the screen rulings of the output imaging screening,
  screen angles that differ by at most 1% from the screen angles in the output imaging screening, and
  dot shapes that are substantially the same as the dot shapes in the output imaging screening.

52. A computer readable carrier medium as described in claim 21, wherein the screens of the RES3 screened image have
  screen rulings that differ by at most 5% from the screen rulings of the output imaging screening,
  screen angles that differ by at most 1% from the screen angles in the output imaging screening, and
  dot shapes that are substantially the same as the dot shapes in the output imaging screening.

53. An apparatus as described in claim 37, wherein the screens of the RES3 screened image have
  screen rulings that differ by at most 5% from the screen rulings of the output imaging screening,
  screen angles that differ by at most 1% from the screen angles in the output imaging screening, and
  dot shapes that are substantially the same as the dot shapes in the output imaging screening.

* * * * *

UNITED STATES PATENT AND TRADEMARK OFFICE
CERTIFICATE OF CORRECTION

| | |
|---|---|
| PATENT NO. | : 7,068,391 B2 |
| APPLICATION NO. | : 09/792623 |
| DATED | : June 27, 2006 |
| INVENTOR(S) | : Dewitte et al. |

It is certified that error appears in the above-identified patent and that said Letters Patent is hereby corrected as shown below:

column 8, line 3, kindly change "computer processing 100" to -- computer processing 101--.

column 8, line 7, kindly change "processing system 100" to -- processing system 101--.

column 13, lines 26–27, kindly change "proofing device 116." to -- proofing device 110.--.

column 22, line 20, kindly change "farther comprising" to -- further comprising--.

Signed and Sealed this

Fifteenth Day of August, 2006

JON W. DUDAS
*Director of the United States Patent and Trademark Office*